(12) United States Patent
Fernald

(10) Patent No.: US 9,742,209 B2
(45) Date of Patent: Aug. 22, 2017

(54) SYSTEM AND APPARATUS FOR IMPROVING THE UTILITY OF REGULATORS AND ASSOCIATED METHODS

(71) Applicant: Silicon Laboratories Inc., Austin, TX (US)

(72) Inventor: Kenneth W. Fernald, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 481 days.

(21) Appl. No.: 14/523,559

(22) Filed: Oct. 24, 2014

(65) Prior Publication Data

US 2016/0118884 A1    Apr. 28, 2016

(51) Int. Cl.
| | | |
|---|---|---|
| G06F 13/12 | (2006.01) | |
| H03K 19/094 | (2006.01) | |
| H02J 7/00 | (2006.01) | |
| G06F 1/26 | (2006.01) | |
| H02J 1/06 | (2006.01) | |
| H02J 1/00 | (2006.01) | |

(52) U.S. Cl.
CPC .............. *H02J 7/0054* (2013.01); *G06F 1/26* (2013.01); *H02J 1/06* (2013.01); *H02J 2001/008* (2013.01)

(58) Field of Classification Search
USPC .................................. 323/268, 267
See application file for complete search history.

(56) References Cited

U.S. PATENT DOCUMENTS

| | | | |
|---|---|---|---|
| 7,619,444 B1* | 11/2009 | Shaikh ........... | H03K 19/017545 326/68 |
| 2008/0129256 A1* | 6/2008 | La Placa ............... | G11C 16/30 323/234 |
| 2010/0066303 A1* | 3/2010 | Lam ...................... | H02J 7/0054 320/106 |
| 2011/0095737 A1* | 4/2011 | Chu ......................... | G05F 1/575 323/281 |
| 2013/0271107 A1* | 10/2013 | Grossier ................... | G05F 1/56 323/349 |
| 2014/0167509 A1* | 6/2014 | Fernald .................... | H02J 1/00 307/31 |
| 2015/0194886 A1* | 7/2015 | Zanetta ................. | H02M 3/158 327/309 |
| 2015/0257231 A1* | 9/2015 | Mentze .............. | H05B 33/0815 315/307 |
| 2016/0188245 A1* | 6/2016 | Thadi Suryaprakash ....... | G06F 1/3287 710/13 |

* cited by examiner

*Primary Examiner* — Hyun Nam
(74) *Attorney, Agent, or Firm* — Law Offices of Maximilian R. Peterson

(57) ABSTRACT

An integrated circuit (IC) includes a first circuit that is powered by a first supply voltage, and a second circuit that is powered by a second supply voltage. The second supply voltage has a lower level than the first supply voltage. The IC further includes a power management circuit. The power management circuit includes a switch-mode DC-DC regulator that is coupled to a plurality of pins of the IC in a pre-defined configuration. The power management circuit provides the first and second supply voltages to power up the IC in a default configuration without knowledge of the pre-defined configuration.

20 Claims, 8 Drawing Sheets

SYSTEM AND APPARATUS FOR IMPROVING THE UTILITY OF REGULATORS AND ASSOCIATED METHODS

TECHNICAL FIELD

The disclosure relates generally to improved voltage or power regulators and, more particularly, to apparatus for regulators with improved utility, and associated methods.

BACKGROUND

Electronic devices, such as the integrated circuits (IC) 103 shown in FIG. 1, commonly include circuits 106 (labeled "HV circuits") that operate from a relatively high DC supply voltage (for example, 3V). IC 103 also includes circuits 109 (labeled "LV circuits") that operate from a lower DC supply voltage (for example, 1V), i.e., lower than the relatively high DC supply voltage.

To accommodate such circuits, IC 103 includes an internal linear regulator 112 to generate the low-voltage supply (1V) from the high-voltage supply (3V, as provided by battery 115). Linear regulator 112 drives the 1V supply rail, including a pin to an external capacitor 118.

Often, the actual supply voltage to HV circuits 106 is higher than the level that would support a given performance specification. For example, although HV circuits 106 may only have a minimum operating supply voltage of 2V, it may be supplied by a 3V power source. Assuming that HV circuits 106 consume approximately the same supply current independent of the supply voltage, HV circuits 106 consume about 50% more power than necessary. Similarly, linear regulator 112 consumes approximately two times the power consumed by LV circuits 109.

To reduce the excess power consumption in the IC in FIG. 1, IC 103 in FIG. 2 incorporates a switch-mode DC-DC regulator 121 to drop a higher supply voltage down to a level closer to the minimum voltage actually required by the circuitry. For example, an inductor-based switch-mode DC-DC regulator 121 (using inductor 124 in conjunction with capacitor 118A) is used in the arrangement in FIG. 2 to step down the voltage of a 3V battery 115 to the 2V level appropriate for HV circuits 106.

A switching DC-DC regulator can provide power transfer efficiencies much higher than that of a typical linear regulator. Using a linear regulator to drop the battery voltage from 3V to 2V for HV circuits 106 would have relatively little impact on the power consumed from the battery, while switch-mode DC-DC regulator 121 with, say, 90% efficiency, would reduce the battery power drain by approximately 26%.

In IC 103 of FIG. 2, switch-mode DC-DC regulator 121 is used to generate the HV supply (2V) used by both HV circuits 106 and linear regulator 112, which generates the LV supply. By reducing the supply voltage to linear regulator 112, switch-mode DC-DC regulator 121 reduces the power loss in linear regulator 112 relative to the arrangement in FIG. 1. Linear regulator 112 in FIG. 2, however, still wastes about the same amount of power as consumed by LV circuits 109 (compared to wasting twice the power consumed by LV circuits 109 in FIG. 1).

One way of reducing the power lost in linear regulator 112 is to further reduce its input voltage. However, given that the 2V supply generated by switch-mode DC-DC regulator 121 is limited by the minimum operating voltage of HV circuits 106, switch-mode DC-DC regulator 121 output voltage cannot be further reduced, given the circuit arrangement of FIG. 2.

An alternative arrangement, shown in FIG. 3, uses switch-mode DC-DC regulator 121 to power LV circuits 109 directly from battery 115, i.e., keep HV circuits 106 powered directly from external battery 115. In this arrangement, switch-mode DC-DC regulator 121 generates the 1V supply for LV circuits 109, while HV circuits 106 operate directly from 3V battery 115. Although the power consumed by HV circuits 106 does not benefit from using switch-mode DC-DC regulator 121, the power loss of a linear regulator (as shown in FIGS. 1-2) is eliminated and replaced by a smaller power loss in switch-mode DC-DC regulator 121.

Depending on the relative power consumption of HV circuit 106 and LV circuits 109 and their operating supply voltages, some ICs might benefit more from the arrangement shown in FIG. 2, while other ICs might benefit more from the arrangement shown in FIG. 3. For example, if the HV circuits' power consumption is much larger than the LV circuits' power consumption, using switch-mode DC-DC regulator 121 to generate the supply to HV circuits 106 provides a larger benefit, as the power saved in HV circuits 106 would exceed the potential power savings of the arrangement in FIG. 3. Conversely, if the power consumed by LV circuits 109 dominates, the arrangement in FIG. 3 would provide a larger benefit, given that the power saved by eliminating linear regulator 112 would exceed the power loss in HV circuits 106 due to the larger supply voltage provided to HV circuits 106.

SUMMARY

According to an exemplary embodiment, an IC includes a first circuit that is powered by a first supply voltage, and a second circuit that is powered by a second supply voltage. The second supply voltage has a lower level than the first supply voltage. The IC further includes a power management circuit. The power management circuit includes a switch-mode DC-DC regulator that is coupled to a plurality of pins of the IC in a pre-defined configuration. The power management circuit provides the first and second supply voltages to power up the IC in a default configuration without knowledge of the pre-defined configuration.

According to another exemplary embodiment, a method of supplying power to circuitry in an IC is disclosed. The circuitry in the IC includes a first circuit powered by a first supply voltage and a second circuit powered by a second supply voltage, where the second supply voltage has a lower level than the first supply voltage, and a switch-mode DC-DC regulator coupled to a plurality of pins of the IC in a pre-defined configuration. The method includes supplying the first and second voltages to power up the IC in a default configuration without knowledge of the pre-defined configuration.

According to another exemplary embodiment, an IC includes a first circuit powered by a first supply voltage, and a second circuit powered by a second supply voltage. The second supply voltage has a lower level than the first supply voltage. The IC further includes a power management circuit. The power management circuit includes a switch-mode DC-DC regulator and a linear regulator. Depending on the relative power consumptions of the first and second circuits: (a) the first circuit is selectively powered by an external power source or by the switch-mode DC-DC regulator, and (b) the second circuit is selectively powered by the switch-mode DC-DC regulator or by the linear regulator.

BRIEF DESCRIPTION OF THE DRAWINGS

The appended drawings illustrate only exemplary embodiments and therefore should not be considered as limiting the scope of the application or the claims. Persons of ordinary skill in the art appreciate that the disclosed concepts lend themselves to other equally effective embodiments. In the drawings, the same numeral designators used in more than one drawing denote the same, similar, or equivalent functionality, components, or blocks.

DETAILED DESCRIPTION

Figure 1:
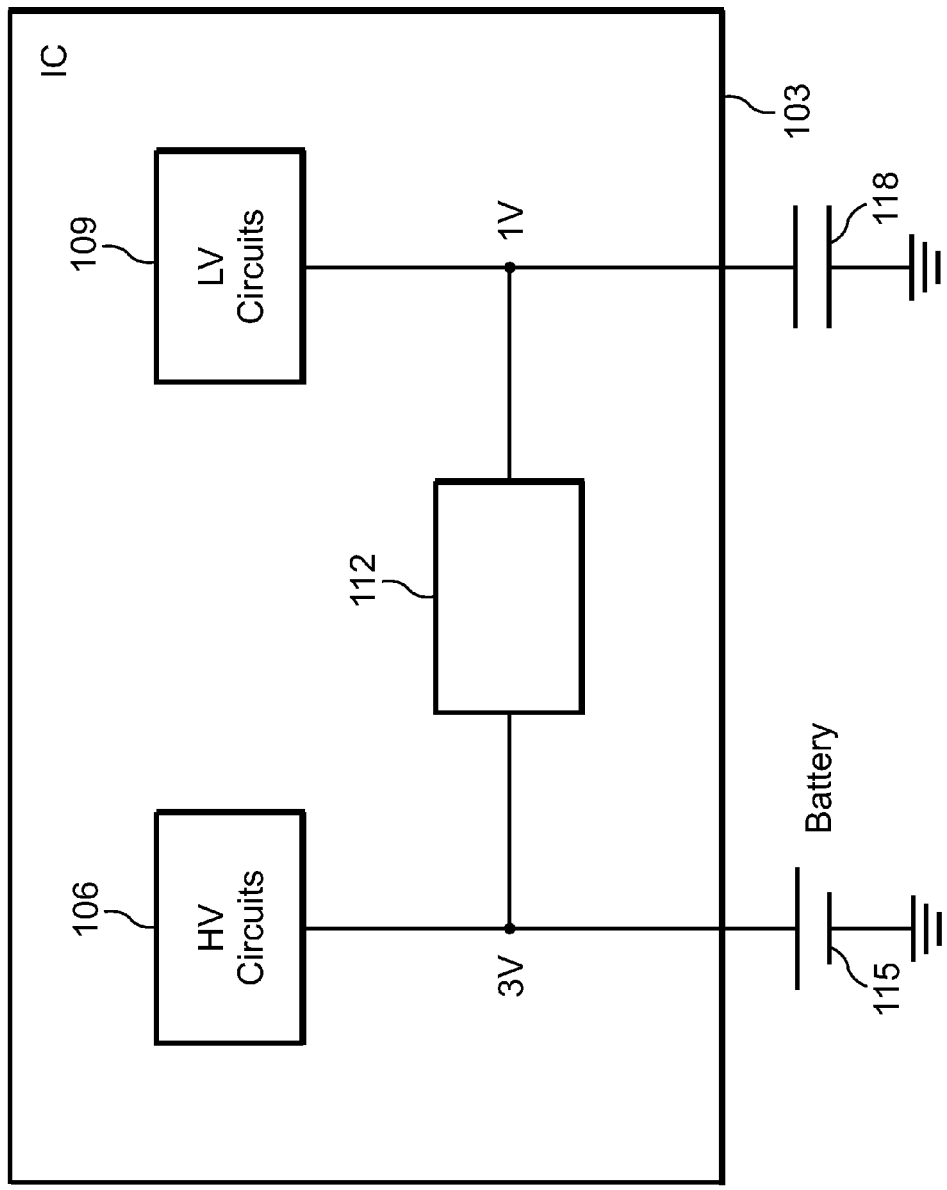
FIG. 1 illustrates a conventional arrangement for powering circuitry in an IC.
Figure 2:
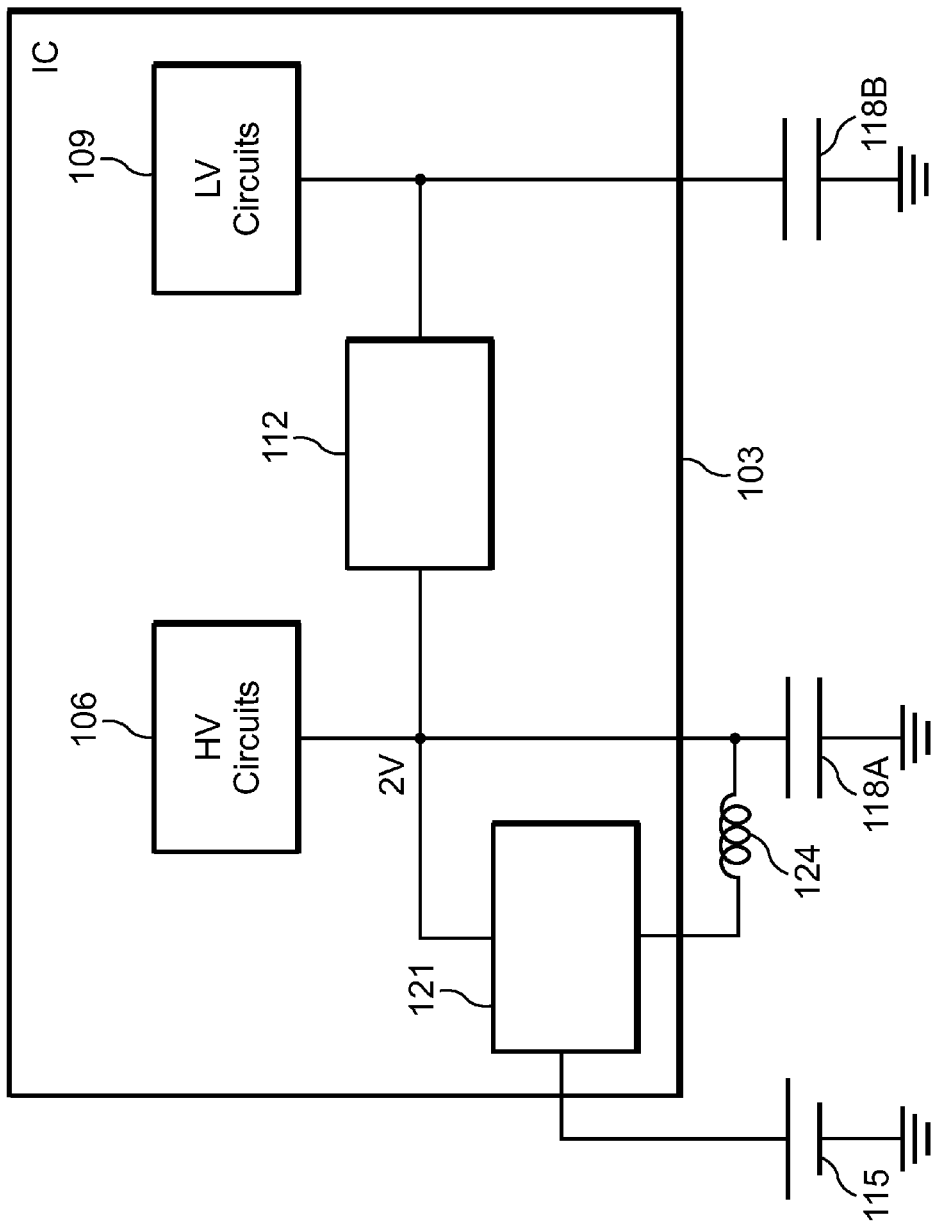
FIG. 2 depicts another conventional arrangement for powering circuitry in an IC.
Figure 3:
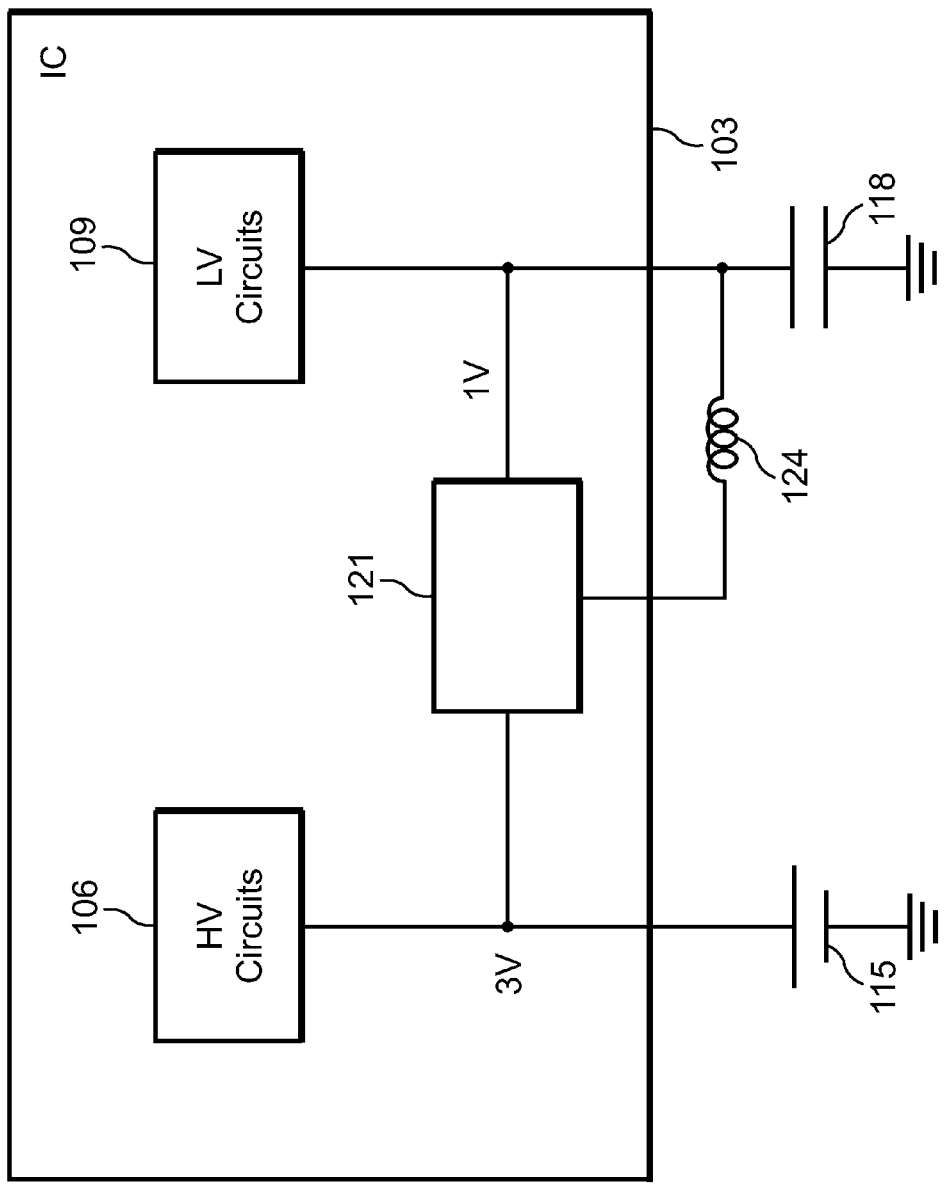
FIG. 3 shows an additional conventional arrangement for powering circuitry in an IC.

The disclosed concepts relate generally to regulators with improved utility. More specifically, the disclosed concepts provide apparatus and methods for improving the utility of internal power regulators, such as DC-DC switching regulators, which provide power efficiency benefits.

Exemplary embodiments provide a number of advantages or benefits. For example, the regulator, e.g., a switch-mode DC-DC regulator, in exemplary embodiments may be used to power high-voltage power pins or circuits or lower-voltage power pins or circuits while still providing the ability to startup devices, such as ICs, without a priori knowledge (at the time of startup or power-up) of how, or even whether, the regulator is coupled to such a device.

As another example, exemplary embodiments accommodate changes in relative power consumptions of HV and LV circuitry in ICs. More specifically, exemplary embodiments allow dynamic reduction of power consumption in devices, such as ICs, where the relative power consumption of HV and LV circuits changes to a relatively large extent, depending on the application of the IC or the tasks it performs at a given time.

By way of an example and without limitation, a general-purpose microcontroller unit (MCU) might contain HV analog or mixed-signal circuits, such as analog-to-digital converters (ADCs), analog comparators, oscillators, phase locked loops (PLLs), reference generators, etc. In addition, the example MCU might contain digital LV circuits such as microprocessor(s), processor(s), timers, serial interfaces, math or floating-point or arithmetic processing engines, etc.

Depending on the configuration of the MCU (e.g., via firmware, user programs, etc.), any number of analog functions might be enabled for a given example application, causing the HV power consumption to range from microwatts to many milliwatts. Similarly, any number of digital functions might be enabled, and might cause the digital logic to operate at clock frequencies ranging from kilohertz to hundreds of megahertz or higher, causing the power consumption of the LV circuits to vary widely from application to application.

In other words, even for the same IC design, it might be beneficial to use a switch-mode DC-DC regulator to power the HV circuits (and the LV circuits via an additional linear regulator, as described below in detail) in some applications, and to power the LV circuits from a switch-mode DC-DC regulator in other applications. In other applications, a switch-mode DC-DC regulator might not be used at all, due to cost or electromagnetic interference (EMI) considerations.

Exemplary embodiments can accommodate such scenarios. More specifically, in exemplary embodiments, an IC includes a switch-mode DC-DC regulator that is coupled to circuitry or components external to the IC via a plurality of pins of the IC in a pre-defined configuration. Techniques are provided such that the IC may be powered with different external configurations while still having the ability to power-up in a functional, default configuration, without knowledge of how the switch-mode DC-DC regulator is externally coupled to the power pins of the IC that correspond to the HV and LV circuits of the IC, i.e., without knowledge of the pre-defined configuration.

Rather than simply fixing the startup behavior of the switch-mode DC-DC regulator for one configuration or another, exemplary embodiments provide for techniques that accommodate a variety of circuit configurations. For example, if the switch-mode DC-DC regulator always started regulating to, say, 2V, in the case where the switch-mode DC-DC regulator powers the LV circuits, the LV circuits may be damaged by excessive supply voltage.

On the other hand, if the switch-mode DC-DC regulator always started regulating to, say, 1V, the HV circuits might have an inadequate supply voltage, thus potentially preventing the IC from operating correctly. Exemplary embodiments overcome such disadvantages, as described below in detail, without using additional pins of the IC. Note that one might use an input/output (I/O) input to the IC to configure the switch-mode DC-DC regulator, but doing so would use an additional pin, a disadvantage in ICs with relatively small pin-counts.

Figure 4:
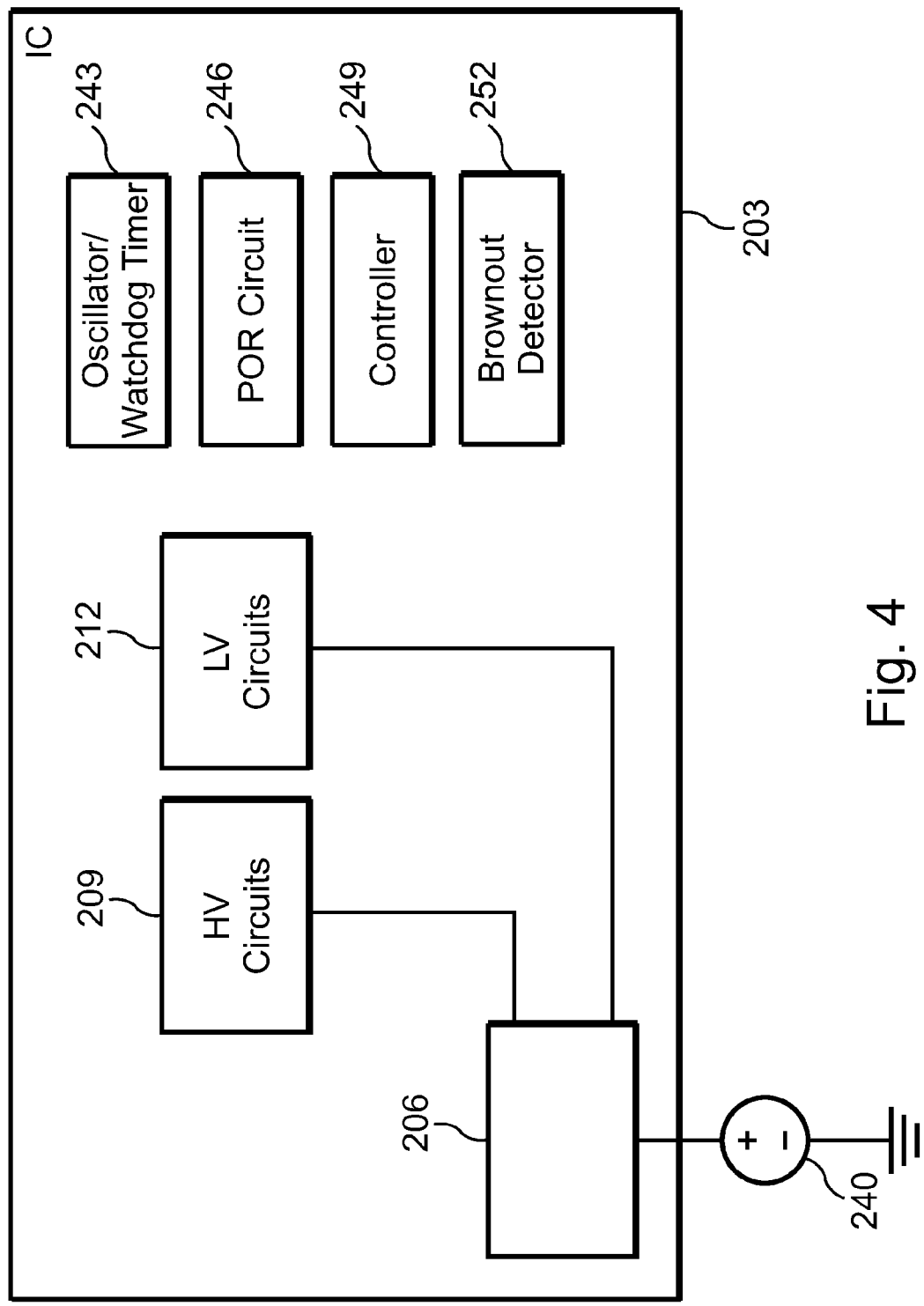
FIG. 4 depicts an IC according to an exemplary embodiment.

Exemplary embodiments provide techniques for supporting a range of switch-mode DC-DC regulator configurations without limiting the IC's ability to startup and execute, for example, firmware, user programs or code, etc., associated with a given application. FIG. 4 depicts an IC 203 according to an exemplary embodiment.

IC 203 may include a variety of circuitry, such as circuits that operate from a relatively low supply voltage, labeled as "LV circuits" 212. IC 203 may also include HV circuits 209, which operate from a relatively high supply voltage (higher than the supply voltage for LV circuits 212).

For example, in the case of an MCU, the MCU might include analog circuits (included in HV circuits 209) that can operate at higher supply voltages, for instance because they are designed using high-voltage transistors and other components. HV circuits 209 may also include digital circuitry designed to operate at higher voltages, such as digital circuitry designed using high-voltage transistors. The MCU might also include digital circuits (included in LV circuits 212) that are designed using low-voltage transistors and, therefore, operate at a lower supply voltage.

Regardless of the precise type and nature of LV circuits 212 and HV circuits 209, IC 203 includes a power management circuit 206. Power management circuit 206, as described below in detail, receives power from an external (to IC 203) source 240, such as a voltage source, and provides power to LV circuits 212 and HV circuits 209.

Power management circuit 206 also couples to external components or circuit elements, as described below in detail. The type, number, and configuration of the components or elements, and how they couple to power management 206, depends on the configuration used for providing power to IC 203 overall.

IC 203 might include a variety of other circuits, such as oscillator/watchdog timer 243, power-on reset (POR) circuit 246, controller 249, brownout detector 252, etc. On initial power up, POR circuit 146 may hold IC 203 in a reset condition until appropriate supply voltage levels are attained (e.g., as provided via power management circuit 206). Once POR circuit 246 releases the reset condition, various events might take in IC 203, such as starting oscillator/watchdog timer 243.

The oscillator in oscillator/watchdog timer 243 provides a signal that may be used by various circuit blocks in IC 203, for instance, as a clock signal. In some embodiments, the oscillator may be a clock oscillator. In some embodiments, the oscillator may be an oscillator used in a real-time clock (RTC) circuit. In yet other embodiments, more than one oscillator may be used, as desired.

The watchdog timer in oscillator/watchdog timer 243 provides watchdog timer functions, as desired, for example, when a program running using the resources of IC 203 enters an unintended state (e.g., "hangs"). In some embodiments, the watchdog timer may function to return power management circuit 206 to a known state, such as a preset or POR state.

Controller 249 might control a variety of functions within IC 203. For example, in response to firmware or user program instructions or code, controller 249 might control the functions and/or configuration of the power supply arrangement via power management circuit 206.

Brownout detector 252 provides a failsafe for drops in the IC's external (and/or internal) voltage supply. It compares the supply level (or a scaled version of it) to a reference signal, for example, a voltage provided by a bandgap reference circuit, and signals controller 249 and/or power management circuit 206 when one or more supply voltages falls below a specified level.

Note that one or more of the circuit blocks shown in IC 203 may be combined as one circuit, as desired. For example, the functionality of controller 249 might be implemented in power management circuit 206. As another example, the functionality of brownout detector 252 and/or POR circuit 246 might be implemented in power management circuit 206, as desired.

Note further that FIG. 4 shows merely one example of the architecture and circuitry of IC 203. Thus, IC 203 may include fewer and/or different blocks of circuitry than FIG. 4 shows. Conversely, IC 203 may include more and/or different blocks of circuitry than the exemplary embodiment in FIG. 4.

Figure 5:
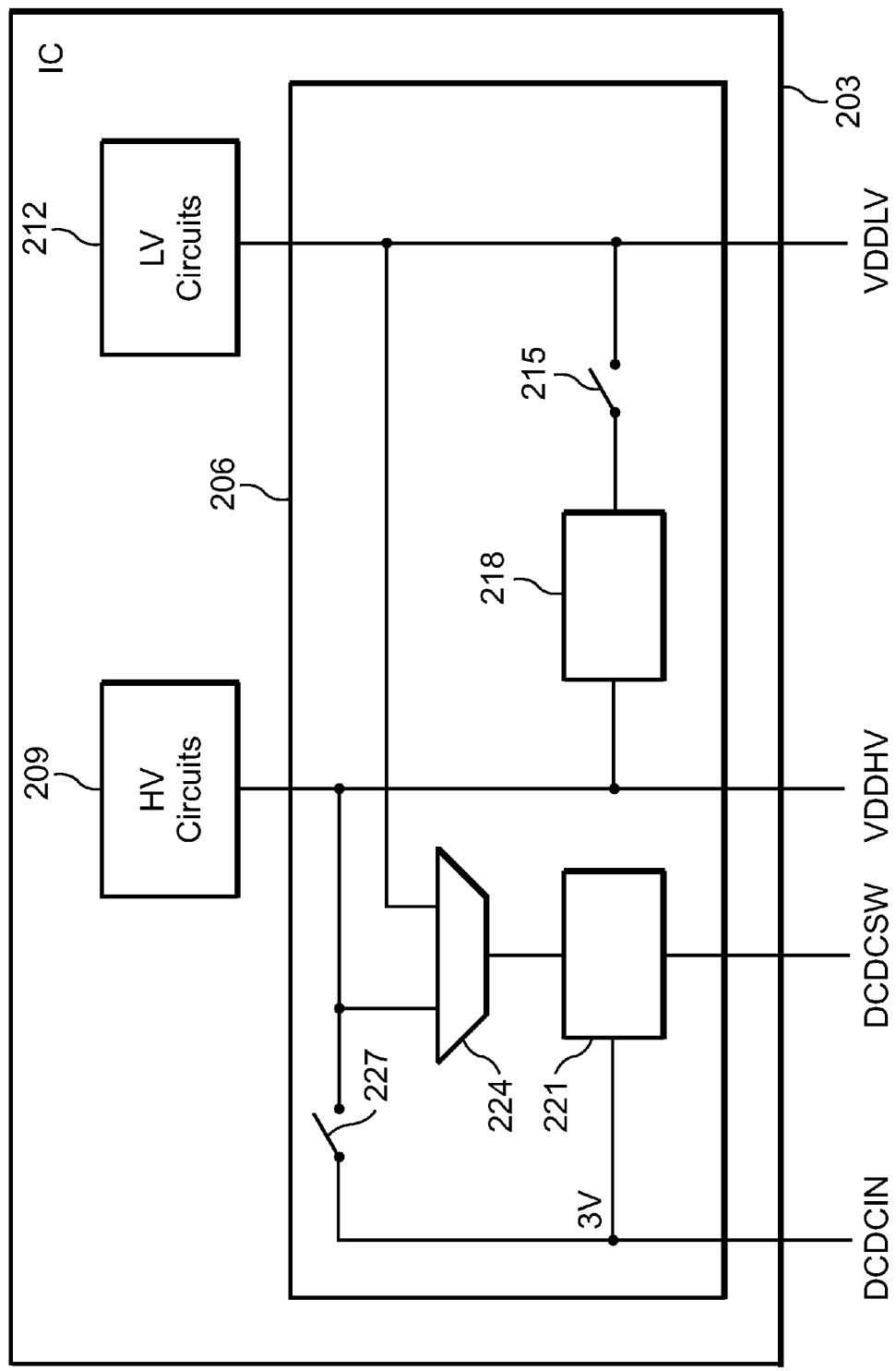
FIG. 5 illustrates an IC, including a power management circuit, according to an exemplary embodiment.

FIG. 5 illustrates an IC 203, including power management circuit 206, according to an exemplary embodiment. Note that, in exemplary embodiments, IC 203 may include other blocks of circuitry, such as oscillator/watchdog timer 243, POR circuit 246, controller 249, brownout detector 252, etc.

Note also that FIG. 5 shows the general architecture of power management circuit 206. In other words, power management circuit 206 may be configured, as described below in detail, to perform desired functionality by using external components and the like.

More specifically, power management circuit 206 may be coupled to circuitry and/or components external to IC 203 via a set of pins or similar coupling mechanism. In the exemplary embodiment of FIG. 5, power management circuit 206 may be coupled to circuitry and/or components external to IC 203 via pins or coupling points labeled "DCDCIN," "DCDCSW," "VDDHV," and "VDDLV."

Power management circuit 206 includes a switch-mode DC-DC regulator 221, coupled to receive an input voltage via the DCDCIN pin or coupling point, for example, from an external power source (e.g., see voltage source 240 in FIG. 4). Referring to FIG. 5, switch-mode DC-DC regulator 221 may couple to external components or circuitry via the DCDCSW pin or coupling point. Examples of such components include inductors, capacitors, etc.

Note that, in exemplary embodiments, switch-mode DC-DC regulator 221 may have a variety of topologies, depending on factors such as performance and design specifications for a given application, cost, type and/or size of external components or circuitry, and the like. In some embodiments, switch-mode DC-DC regulator 221 may be a step-down (or buck) regulator. In some embodiments, switch-mode DC-DC regulator 221 may be a synchronous step-down (or synchronous buck) regulator. Other possibilities are contemplated in other embodiments, for example, Cuk regulators or charge-pump based regulators, as desired.

Furthermore, switch-mode DC-DC regulator 221 may use a variety of control schemes, as persons of ordinary skill in the art will understand. Generally, switch-mode DC-DC regulator 221 may use pulse-width-modulation (PWM) to modulate a pulse-width of one or more switch control signals, as persons of ordinary skill in the art will understand. In some embodiments, switch-mode DC-DC regulator 221 may use voltage-mode PWM control. In other embodiments, switch-mode DC-DC regulator 221 may use current-mode PWM control. Other control and regulator variations are contemplated, for example, resonant topologies and associated control circuits, as desired.

In the embodiment shown, switch-mode DC-DC regulator 221 includes the active components of the regulator (e.g., controller, power switch, etc.) within IC 203. Other components that facilitate operation of switch-mode DC-DC regulator 221, such as passive components (inductors, capacitors) may be external to IC 203, and couple to switch-mode DC-DC regulator 221 via the DCDCSW pin or coupling point.

Power management circuit 206 includes a bypass switch 227 coupled between the input supply of switch-mode DC-DC regulator 221 (DCDCIN) and VDDHV, the supply pin or coupling point for HV circuits 209. Switch 227 allows the selective application of the voltage at DCDCIN to VDDHV, i.e., supply the voltage at DCDCIN to HV circuits 209.

Switch-mode DC-DC regulator 221 typically has a sense circuit (not shown) that senses a voltage (e.g., the output voltage of switch-mode DC-DC regulator 221) and compares that voltage to a reference voltage to generate an error signal. The error signal is typically used to generate control signals for switch-mode DC-DC regulator 221, e.g., a PWM signal.

Power management circuit 206 includes a multiplexer (MUX) 224 that allows one of two voltages to be used as the sense voltage input to switch-mode DC-DC regulator 221. Specifically, MUX 224 allows selection of either the supply voltage for HV circuits 209 (VDDHV) or the supply voltage for LV circuits 212 (VDDLV). The selection of the sense voltage may occur under the control of circuitry (not shown) in power management 206 or under the control of controller 249 (see FIG. 4).

Referring again to FIG. 5, power management circuit 206 also includes a linear regulator 218. Linear regulator 218 receives its input voltage from VDDHV. The output of linear regulator 218 is coupled to VDDLV via switch 215. Thus, depending on the state of switch 215, the output voltage of linear regulator 218 drives VDDLV. The state of switch 215 may be controlled by the control of circuitry (not shown) in power management 206 or by controller 249 (see FIG. 4).

Referring to FIG. 5, linear regulator 218 may have a variety of topologies and circuit arrangements, as desired, and as persons of ordinary skill in the art will understand. For example, in some embodiments, linear regulator 218 may constitute a low-dropout (LDO) regulator. Generally, the choice of the topology and characteristics of linear regulator 218 depends on design and performance specifications, for example, the input and output voltages (or input-output differential), amount of power regulated, available fabrication technology, etc.

Regardless of the exact choice of the topology and characteristics of linear regulator 218 and switch-mode DC-DC regulator 221, when power is applied at DCDCIN, i.e., at startup or power-up, a circuit, such as POR circuit 246 (see FIG. 4) places IC 203 into a default or initial state. In the default state: (1) bypass switch 227 is enabled, so as to couple DCDCIN to VDDHV; (2) linear regulator 218 is enabled (and switch 215 is closed), causing it to generate a supply voltage at VDDLV; and (3) switch-mode DC-DC regulator 221 is disabled, causing its DCDCSW output to be in a high-impedance state.

As discussed below in detail, the default state allows the IC to power up successfully, regardless of the external connections between switch-mode DC-DC regulator 221 and the IC's power pins (VDDHV, VDDLV) and/or external components, such as inductors and capacitors (described below in detail). In other words, power management circuit 206 or circuitry controlling it, such control of circuitry (not shown) in power management 206 or controller 249 (see FIG. 4), places IC 203 in a state such that it may successfully or properly power up, without knowledge of how power management circuit 206 may be ultimately or subsequently configured, for example, in response to firmware or user program instructions or code.

Note that in exemplary embodiments, bypass switch 227 may be implemented in a variety of ways, as persons of ordinary skill in the art will understand. For example, in some embodiments, bypass switch 227 may be part of a power multiplexing or switching network.

Similarly, switch 215, used to selectively couple linear regulator 218 to VDDLV, may be implemented as a switch external to linear regulator 218, as the exemplary embodiment of FIG. 5 shows. In other exemplary embodiments, switch 215 may be implemented through the ability of linear regulator 218 to place its output into a relatively high-impedance or disabled state, for example, by properly biasing the pass element or transistor in linear regulator 218.

As noted, in exemplary embodiments, power management circuit 206 may be used and configured in a variety of ways. For example, power management circuit 206 may be configured to provide adequate power to an IC, regardless of the external switch-mode DC-DC regulator configuration (coupling to external components), thereby allowing the IC to power up properly or successfully, and execute firmware, user programs, etc., or to perform desired tasks for a given application.

Figure 6:
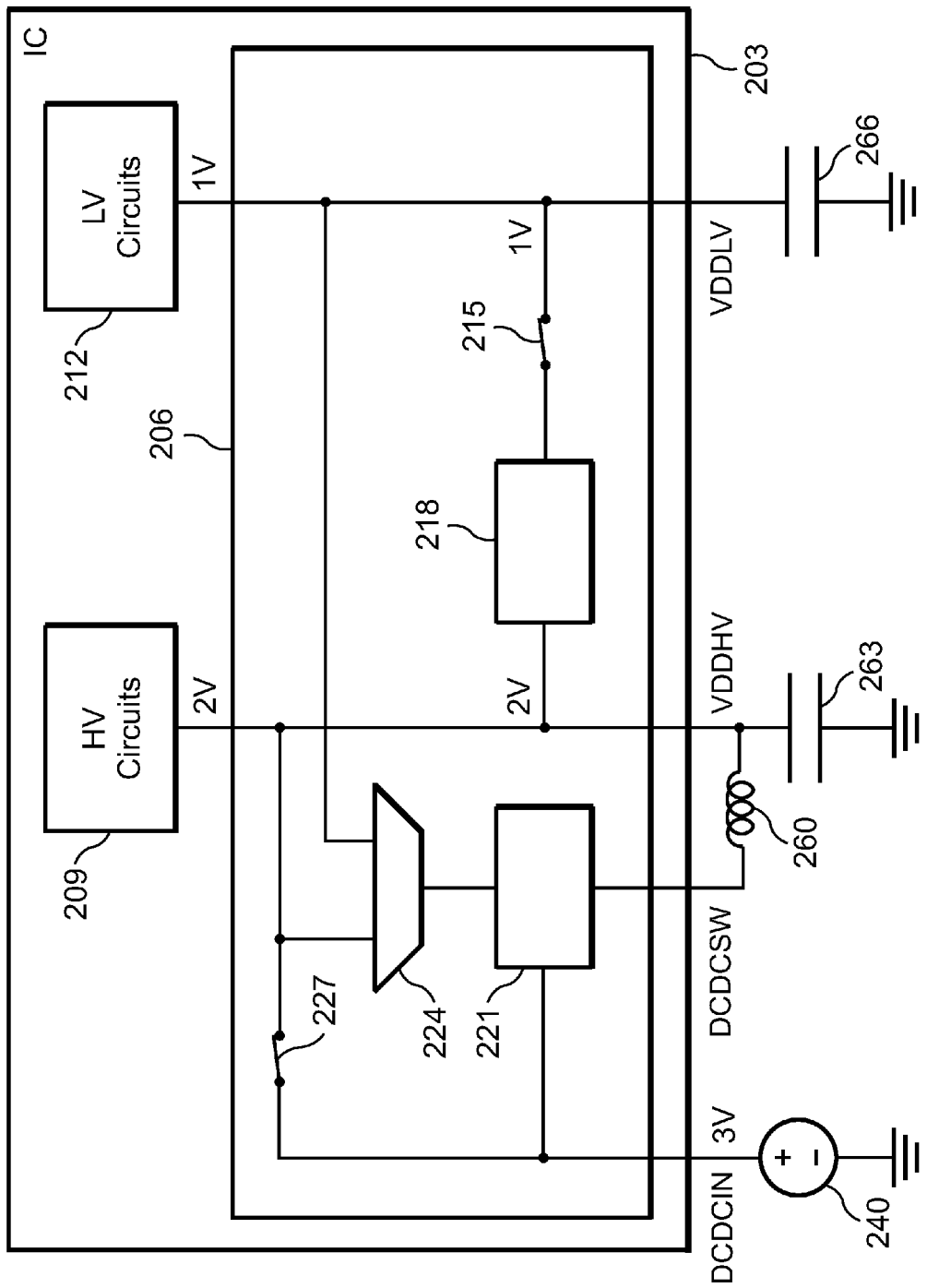
FIG. 6 depicts a circuit arrangement for providing power to an IC according to an exemplary embodiment.

FIG. 6 depicts a circuit arrangement for providing power to an IC 203 according to an exemplary embodiment. In this embodiment, switch-mode DC-DC regulator 221 is externally coupled to inductor 260 and capacitor 263 (e.g., a bypass or decoupling or filter capacitor) in order to supply power to HV circuits 209 via the VDDHV pin or coupling point.

As discussed above, when power is applied at DCDCIN, the DCDCSW output has a high-impedance state, and bypass switch 227 is enabled to provide power from source 240 to VDDHV, i.e., the supply for HV circuits 209. In addition, linear regulator 218 is enabled (e.g., switch 215 is closed), causing it to provide power to VDDLV, i.e., the supply for LV circuits 212. Consequently, IC 203 is properly powered, and may begin executing firmware, user programs, etc., or perform desired tasks for a given application.

After the initial power-up, the firmware, user program or code, or other source (e.g., instructions or configuration received from a host or source external to IC 203) generally performs the following steps: (1) configures switch-mode DC-DC regulator 221 to sense the VDDHV supply level (by providing an appropriate select signal to MUX 334); (2) configures switch-mode DC-DC regulator 221 to generate the desired VDDHV supply level (e.g., 2V); and (3) enables switch-mode DC-DC regulator 221 and disables bypass switch 227. As a consequence, switch-mode DC-DC regulator 221 provides power to HV circuits 209, as desired for the application.

Figure 7:
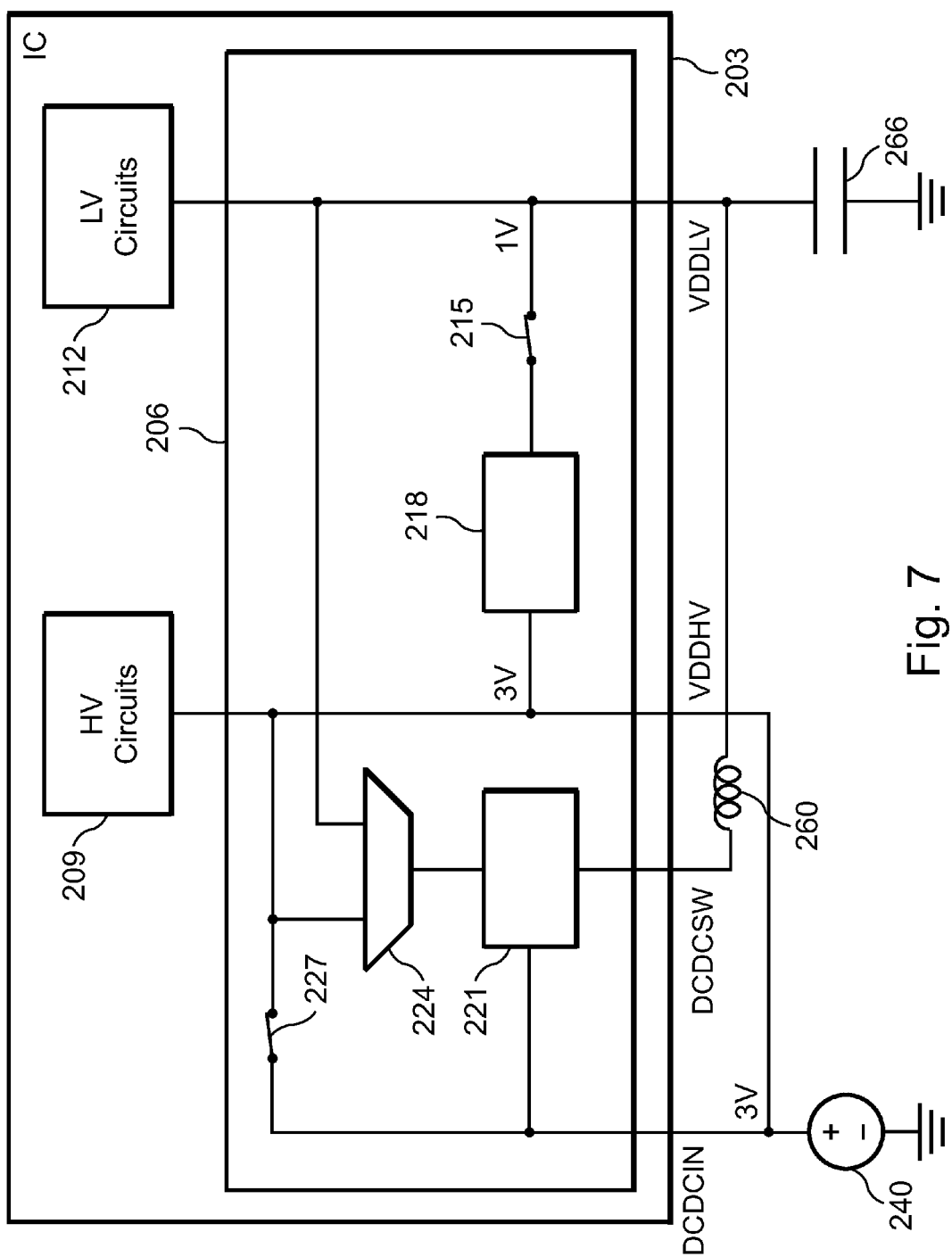
FIG. 7 illustrates a circuit arrangement for providing power to an IC according to another exemplary embodiment.

FIG. 7 illustrates a circuit arrangement for providing power to an IC according to another exemplary embodiment. In this embodiment, switch-mode DC-DC regulator 221 is externally coupled so as to allow it to provide power to LV circuits 212 via the VDDLV pin or coupling point. More specifically, inductor 260, part of the overall switch-mode regulator topology, couples the DCDCSW pin to the VDDLV pin. Furthermore, capacitor 266 is also coupled to the VDDLV pin to complete the overall switch-mode regulator topology.

Similar to the embodiment of FIG. 6, in the embodiment of FIG. 7, the DCDCSW pin initially has a high-impedance state. Similarly, bypass switch 227 is enabled (closed). Note, however, that the state of bypass switch 227 is largely irrelevant in this embodiment, since it is effectively shorted externally. Specifically, external power source 240 (e.g., a 3V battery) powers both the DCDCIN and VDDHV pins.

Given the initial high-impedance state of the DCDCSW, coupling of that pin to inductor 260 has little or no effect on the ability of IC 203 to power up. The VDDHV pin is powered from the external source 340, thus providing power to both HV circuits 209 and linear regulator 218. Linear regulator 218 is enabled (and switch 215 is closed), and therefore provides power to LV circuits 212. Consequently, IC 203 is properly powered, and may begin executing firmware, user programs, etc., or perform desired tasks for the application.

After the initial power-up, the firmware, user program or code, or other source (e.g., instructions or configuration received from a host or source external to IC 203) generally performs the following steps: (1) configures switch-mode DC-DC regulator 221 to sense the VDDLV signal (by providing an appropriate select signal to MUX 224); (2) configures switch-mode DC-DC regulator 221 to generate the desired VDDLV voltage (e.g., 1V); (3) enables switch-mode DC-DC regulator 221; and (4) disables linear regulator 218 (and/or open switch 215). Thus, switch-mode DC-DC regulator 221 provides power to LV circuits 212, as desired for the application.

In applications where using switch-mode DC-DC regulator 221 is undesirable (e.g., to avoid the cost of an inductor, to avoid EMI, etc.), the inductor may be omitted. Thus, in such situations, the DCDCSW pin associated with switch-mode DC-DC regulator 221 would generally remain uncoupled to other components or circuitry. Such an application would resemble the configuration shown in FIG. 7, except with inductor 260 removed from the circuit.

In such a scenario, IC 203 powers up in the same manner as described above with respect to FIG. 7, given the default high-impedance state of the DCDCSW pin. Generally, for such an application, the firmware, user program or code takes no further steps in configuring power management circuit 206, as default (initial) power-up state of supplying power to IC 203 would be generally equivalent to the application's power specifications.

Note that exemplary embodiments provide techniques to allow an IC to power up in a predetermined state, and then execute firmware, user program or code regardless of which supported or particular switch-mode DC-DC regulator configuration is applied to the external power connections. For example, exemplary embodiments may allow power up regardless of whether the DC-DC is configured externally to drive VDDHV, VDDLV, or neither, e.g. is unused or used to power additional or unrelated internal or external circuitry (possibly requiring additional sense inputs to MUX 224 to sense additional power supply connections). This attribute allows an IC, such as a general-purpose MCU, to use a common hardware design for a wide range of applications without dedicated pins to indicate the power configuration used for a given application.

As discussed above, the disclosed techniques allow an internal regulator, such as switch-mode DC-DC regulator 221, to be utilized in a manner that reduces the power consumed by IC 203 for a particular application. Specifically, ICs according to exemplary embodiments are capable of starting up and executing application firmware, user program or code regardless of how switch-mode DC-DC regulator 221 is externally coupled (e.g., to VDDHV, VDDLV, DCDCSW).

This attribute allows the external coupling of switch-mode DC-DC regulator 221 to be selected depending on the ratio of the power consumed by HV circuits 209 and LV circuits 212. Some applications, however, may alter the power profile of the IC over time (or the user might want to alter the power profile of the IC).

For example, firmware running on an MCU may operate its digital logic at a relatively high clock rate during some operations, but at a lower clock rate during other operations. The change in the clock frequency may cause the dominant components of the overall IC power consumption to shift between HV circuits 209 and LV circuits 212, depending on in which mode the application or MCU is operating.

In such a case, using a fixed utilization of a switch-mode DC-DC regulator may, generally speaking, not provide the lowest average power consumption over the lifetime of the application. An aspect of the disclosure relates to addressing such scenarios by allowing dynamic utilization or configuration of switch-mode DC-DC regulator 221.

Figure 8:
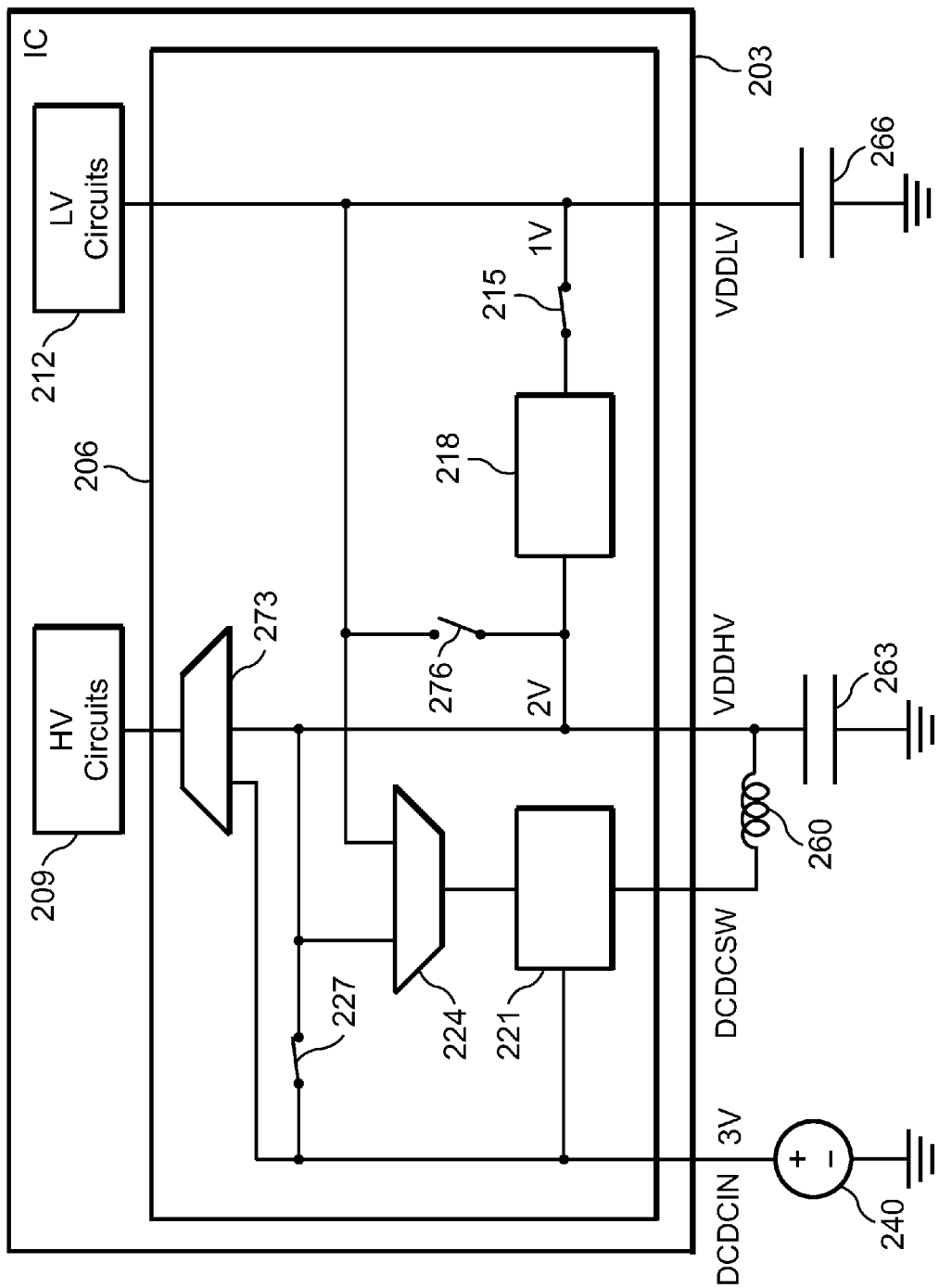
FIG. 8 shows a circuit arrangement for dynamic utilization or configuration of switch-mode regulators according to an exemplary embodiment.

FIG. 8 shows a circuit arrangement according to an exemplary embodiment that provides dynamic utilization or configuration of the switch-mode DC-DC regulator based on the operating state of IC 203, for example, as discussed above. The embodiment in FIG. 8 includes some of the circuitry and blocks discussed above in connection with FIGS. 5-7, but also includes additional circuitry.

Specifically, the exemplary embodiment in FIG. 8 includes a regulator bypass switch 276, coupled across linear regulator 218 and switch 215. The embodiment in FIG. 8 also includes generally a power MUX 273, coupled to the DCDCIN and VDDHV pins, and also to HV circuits 209. Note that, rather than using a power MUX, one may use a double-throw switch by using, for example, several transistors, as desired.

The embodiment of FIG. 8 is generally used with switch-mode DC-DC regulator 221 externally coupled to provide the supply voltage of HV circuits 209, i.e., VDDHV. When operating in a mode where the power consumption of HV circuits 209 dominates (e.g., the power consumption of HV circuits 209 exceeds the power consumption of LV circuits 209), this embodiment operates similarly to the embodiment shown in FIG. 6.

In addition, in the embodiment of FIG. 8, power MUX 273 is controlled, for example, by controller 249 or control circuitry in power management circuit 206, to power HV circuits 209 from the VDDHV pin (i.e., from the output of switch-mode DC-DC regulator 221). Referring again to FIG. 8, in addition, regulator bypass switch 276 is open, i.e., it does not bypass linear regulator 218.

Consequently, switch-mode DC-DC regulator 221 provides power to HV circuits 209 in this mode of operation of IC 203. Linear regulator 218 provides power to LV circuits 212.

When IC 203 operates in a mode where the power consumption of LV circuits 212 dominates (e.g., the power consumption of LV circuits 209 exceeds the power consumption of HV circuits 209), the utilization of switch-mode DC-DC regulator 221 may be changed or reconfigured. Specifically, in such a situation, firmware, user program or code may take the following steps: (1) control power MUX 273 to power HV circuits 209 from the voltage present at the DCDCIN pin (or some other available supply suitable for powering HV circuits 209); (2) lower the output of switch-mode DC-DC regulator 221 to a level appropriate for supplying power to LV circuits 212 (e.g., 1V); and (3) close regulator bypass switch 276, and disable linear regulator 218.

Similar to FIG. 7, switch-mode DC-DC regulator 221 subsequently provides power to LV circuits 212, whereas HV circuits 209 operate directly from another source, e.g., from external source 240.

Note that some voltage drop occurs across power MUX 273 and regulator bypass switch 276. In some embodiments, the output voltage of switch-mode DC-DC regulator 221 may be set larger than the VDDLV level to compensate for the additional voltage drops. One way of implementing this feature is by using MUX 224 so that switch-mode DC-DC regulator 221 senses the VDDLV level rather than the VDDHV level.

In some embodiments, regulator bypass switch 276 may be incorporated into linear regulator 218. For example, regulator bypass switch 276 may also serve as the series or pass elements or device in linear regulator 218. When linear regulator 218 is bypassed, the series device may be enabled directly, or linear regulator 218 may be forced to operate in its dropout mode.

In some embodiments, switch-mode DC-DC regulator 221 may regulate to a voltage high enough to allow linear regulator 218 to maintain regulation (as opposed to bypassing and disabling linear regulator 218 or forcing it into a dropout state). It may be desirable, for example, to allow linear regulator 218 to continue to regulate to reduce the amount of DC-DC induced switching-ripple at VDDHV that couples to the VDDLV supply. Since a linear regulator generally has better noise rejection when regulating (as opposed to operating in dropout or bypassed mode), using the DC-DC regulator to generate a voltage just at or above the dropout voltage of linear regulator 218 saves power while reducing the supply noise at VDDLV.

A number of variations within the scope of disclosure are contemplated in exemplary embodiments. For example, in some embodiments the, power-up state of switch-mode DC-DC regulator 221 may be to sense the VDDLV level, and for the regulator to be enabled. In this case, both switch-mode DC-DC regulator 221 and linear regulator 218 should be designed without the ability to sink a relatively significant amount of current.

Consider, for instance, the situation where switch-mode DC-DC regulator 221 can operate in discontinuous conduction mode, in which sinking of significant load currents is not supported. Similarly, linear regulator 218 may use a high-side power transistor (e.g., a p-type metal oxide semiconductor (PMOS) or PNP bipolar transistor), thereby preventing it from sinking a significant amount of current.

If the IC is configured as shown in FIG. 7 and neither switch-mode DC-DC regulator 221 nor linear regulator 218 can sink a significantly large amount of current, the voltage level of the VDDLV supply will be controlled by the regulator with the higher regulation target voltage. The regulation target voltages of switch-mode DC-DC regulator 221 and linear regulator 218 may be different intentionally or because of normal manufacturing variations.

Regardless, the specified VDDLV level of approximately 1V indicated for this exemplary embodiment will be supplied to LV circuits 211, allowing the IC to power up and execute the firmware, user program or code. If the IC is configured as shown in FIG. 6, the VDDHV supply will still be pulled to DCDCIN by bypass switch 227, and switch-mode DC-DC regulator 221 will not appreciably impact the level of the VDDHV supply, given that the regulator cannot sink an appreciable amount of current.

In other embodiments where switch-mode DC-DC regulator 221 cannot sink a significant amount of current, switch-mode DC-DC regulator 221 may power up in a state where it senses the VDDHV level, and attempts to regulate to some voltage less than the minimum expected voltage provided by source 240. Similar to the embodiment discussed above, if bypass switch 227 is also enabled, the VDDHV supply level will be pulled to 3V in this example, allowing IC 203 to power up as desired. As before, switch-mode DC-DC regulator 221 would not interfere with power up of the IC, given that it would not have the ability to sink appreciable current from the VDDHV supply.

Although exemplary embodiments are shown in the figure with single VDDHV and VDDLV supplies, the disclosed techniques may be applied to ICs with multiple HV and/or LV power pins or supplies. One or more of the HV supply pins may be coupled to switch-mode DC-DC regulator 221, while other HV supply pins may remain coupled to source 240 (or another power source). Similarly, one or more of the LV power pins may be coupled to switch-mode DC-DC regulator 221, while others remain powered by one or more internal (or external) regulators or sources. In some embodiments, the IC might include multiple switch-mode DC-DC regulators, where each switch-mode DC-DC regulator may generate a different (or similar) HV or LV supply voltage, as desired.

Furthermore, some embodiments may provide multiple supply pins from the main power source (e.g., a battery). For example, switch-mode DC-DC regulator 221 may receive power via one or more input power pins, while bypass switch 227 may couple to one or more different power pins. This may be desirable, for example, to help prevent or reduce noise generated at the power input of the DC-DC during switching from coupling through bypass switch 227 directly to the high-voltage supply.

In exemplary embodiments shown in the figures, components associated with switch-mode DC-DC regulator 221 are illustrated as residing outside IC 203 (e.g., in FIGS. 6-8, inductor 260 and capacitors 263 and 266 are shown as components external to IC 203). In other embodiments, however, some of those components might be integrated into or co-packaged with IC 203.

Specifically, depending on factors such as application, cost target, available technology, specifications such as allowable EMI, and the switching frequency of switch-mode DC-DC regulator 221, some or all of such components associated with switch-mode DC-DC regulator 221 and/or linear regulator 218 may be integrated in IC 203. For example, with relatively high switching frequencies and relatively low power levels, the inductor and/or capacitors might be integrated in IC 203, as the switching frequency of switch-mode DC-DC regulator 221 is generally one factor that dictates the values of the inductor and/or capacitors.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art may use certain features of the disclosed concepts independently of the use of other features, without departing from the scope of the disclosed concepts.

The invention claimed is:

1. An integrated circuit (IC), comprising:
a first circuit powered by a first supply voltage;
a second circuit powered by a second supply voltage, the second supply voltage having a lower level than the first supply voltage; and
a power management circuit, comprising a switch-mode DC-DC regulator coupled to a plurality of pins of the IC in a pre-defined configuration, wherein the power management circuit provides the first and second supply voltages to power up the IC in a default configuration without knowledge of the pre-defined configuration.

2. The IC according to claim 1, wherein in the default configuration an external power source coupled to an input pin of the IC is selectively coupled to provide the first supply voltage, a linear regulator in the IC is selectively coupled to provide the second supply voltage, and the switch-mode DC-DC regulator is disabled.

3. The IC according to claim 2, wherein subsequent to the power up of the IC, the switch-mode DC-DC regulator is configured to sense the first supply voltage; the switch-mode DC-DC regulator is configured to provide the first supply voltage; and the switch-mode DC-DC regulator is enabled.

4. The IC according to claim 2, wherein subsequent to the power up of the IC, the switch-mode DC-DC regulator is configured to sense the second supply voltage; the switch-mode DC-DC regulator is configured to provide the second supply voltage; and the switch-mode DC-DC regulator is enabled.

5. The IC according to claim 1, wherein the first circuit comprises analog or mixed-signal circuitry.

6. The IC according to claim 5, wherein the second circuit comprises digital circuitry.

7. The IC according to claim 1, further comprising power-on reset (POR) circuitry to power up the IC in the default configuration.

8. The IC according to claim 1, wherein the switch-mode DC-DC regulator comprises a step-down regulator, and wherein the linear regulator comprises a low-dropout (LDO) regulator.

9. A method of supplying power to circuitry in an integrated circuit (IC), the circuitry in the IC comprising a first circuit powered by a first supply voltage and a second circuit powered by a second supply voltage having a lower level than the first supply voltage, and a switch-mode DC-DC regulator coupled to a plurality of pins of the IC in a pre-defined configuration, the method comprising supplying the first and second voltages to power up the IC in a default configuration without knowledge of the pre-defined configuration.

10. The method according to claim 9, wherein supplying the first and second voltages to power up the IC in a default configuration further comprises:
selectively coupling an external power source coupled to an input pin of the IC to provide the first supply voltage;
selectively coupling a linear regulator in the IC to provide the second supply voltage; and
disabling the switch-mode DC-DC regulator.

11. The method according to claim 9, further comprising, subsequent to the power up of the IC:
configuring the switch-mode DC-DC regulator to sense the first supply voltage;
configuring the switch-mode DC-DC regulator to provide the first supply voltage; and
enabling the switch-mode DC-DC regulator.

12. The method according to claim 9, wherein subsequent to the power up of the IC:
configuring the switch-mode DC-DC regulator to sense the second supply voltage;
configuring the switch-mode DC-DC regulator to provide the second supply voltage; and
enabling the switch-mode DC-DC regulator.

13. The method according to claim 9, wherein the first circuit comprises analog or mixed-signal circuitry; and wherein the second circuit comprises digital circuitry.

14. The method according to claim 9, wherein the switch-mode DC-DC regulator comprises a step-down regulator, and wherein the linear regulator comprises a low-dropout (LDO) regulator.

15. An integrated circuit (IC), comprising:
a first circuit powered by a first supply voltage;
a second circuit powered by a second supply voltage, the second supply voltage having a lower level than the first supply voltage; and
a power management circuit, comprising a switch-mode DC-DC regulator and a linear regulator, wherein depending on the relative power consumptions of the first and second circuits: (a) the first circuit is selectively powered by an external power source or by the switch-mode DC-DC regulator, and (b) the second circuit is selectively powered by the switch-mode DC-DC regulator or by the linear regulator.

16. The IC according to claim 15, wherein to reduce an overall power consumption the first circuit is powered by the switch-mode DC-DC regulator, and the second circuit is powered by the linear regulator.

17. The IC according to claim 15, wherein to reduce an overall collective power consumption the first circuit is powered by the external power source, and the second circuit is powered by the switch-mode DC-DC regulator.

18. The IC according to claim 15, wherein the utilization of the switch-mode DC-DC regulator is dynamically altered depending on the relative power consumptions of the first and second circuit.

19. The IC according to claim 15, wherein the first circuit comprises analog or mixed-signal circuitry; and wherein the second circuit comprises digital circuitry.

20. The IC according to claim 15, wherein the switch-mode DC-DC regulator comprises a step-down regulator, and wherein the linear regulator comprises a low-dropout (LDO) regulator.

* * * * *